(12) United States Patent  
Dannowski et al.

(10) Patent No.: US 8,386,749 B2  
(45) Date of Patent: Feb. 26, 2013

(54) ADDRESS MAPPING IN VIRTUALIZED PROCESSING SYSTEM

(75) Inventors: Uwe Dannowski, Moritzburg (DE); Stephan Diestelhorst, Dresden (DE); Sebastian Biemueller, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 442 days.

(21) Appl. No.: 12/724,912

(22) Filed: Mar. 16, 2010

(65) Prior Publication Data

US 2011/0231630 A1 Sep. 22, 2011

(51) Int. Cl.
  *G06F 12/10* (2006.01)
(52) U.S. Cl. .. 711/207; 711/202; 711/203; 711/E12.065
(58) Field of Classification Search .................. 711/207, 711/202, 203, E12.065
  See application file for complete search history.

(56) References Cited

U.S. PATENT DOCUMENTS 5,129,071 A * 7/1992 Yamagata et al. ............ 718/100
2009/0158004 A1  6/2009 Hasegawa et al.

FOREIGN PATENT DOCUMENTS

EP 2159708 A1 3/2010

OTHER PUBLICATIONS

International Application No. PCT/US2011/028636, Search Report mailed Jul. 28, 2011, 3 pages.

* cited by examiner

*Primary Examiner* — Yong Choe

(57) ABSTRACT

A processing system has one or more processors that implement a plurality of virtual machines that are managed by a hypervisor. Each virtual machine provides a secure and isolated hardware-emulation environment for execution of one or more corresponding guest operating systems (OSs). Each guest OS, as well as the hypervisor itself, has an associated address space, identified with a corresponding "WorldID." Further, each virtual machine and the hypervisor can manage multiple lower-level address spaces, identified with a corresponding "address space identifier" or "ASID". The address translation logic of the processing system translates the WorldID and ASID of the current address space context of the processing system to corresponding WorldID and ASID search keys, which have fewer bits than the original identifiers and thus require less complex translation lookaside buffer (TLB) hit logic. The resulting WorldID and ASID search keys are used to perform one or more TLB lookups to obtain address mapping information related to the particular address space represented by the WorldID/ASID combination.

18 Claims, 4 Drawing Sheets

US 8,386,749 B2

ADDRESS MAPPING IN VIRTUALIZED PROCESSING SYSTEM

FIELD OF THE DISCLOSURE

The present disclosure relates generally to memory management and more particularly to virtual-to-physical memory address translation.

BACKGROUND

Processing systems typically utilize a virtual-addressing scheme such that virtual addresses in corresponding virtual address spaces are mapped to physical addresses of memory locations and input/output (IO) interfaces through the use of page tables and a translation lookaside buffer (TLB). The advent of processor virtualization has complicated this virtual-to-physical address mapping due to the number of different virtual address spaces that may be implemented within a processing system and due to the desire to provide effective isolation among implemented virtual machines. A processing system may support TLB tagging using an identifier representing a corresponding virtual address space. These identifiers often have tens of bits and the TLB hit logic required to handle searches of this size generally are prohibitively complex to implement. Conventional virtualized processing systems therefore often utilize software-based address mapping at the cost of the considerable overhead required to maintain and implement these address mappings under software control.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate example techniques for virtual-to-physical address translation in a virtualized processing environment. In at least one embodiment, a processing system has one or more processors that implement a plurality of virtual machines that are managed by a hypervisor (also known as a virtual machine manager or VMM). Each virtual machine provides a secure and isolated hardware-emulation environment for one or more virtual processors, whereby each virtual processor executes a corresponding guest operating system (OS). Each guest OS/virtual processor, as well as the hypervisor itself, has an associated address space. Further, each virtual machine and the hypervisor may manage multiple lower-level address spaces, such as address spaces associated with particular software applications executed under the control of a guest OS of a virtual machine. Each guest OS typically is identified using a particular identifier, referred to herein as a "WorldID", and the lower-level address spaces managed by the guest OS are identified using particular identifiers that are referred to herein as "address space identifiers" or "ASIDs". Typically, the WorldIDs and ASIDs are tens of bits in length and thus can be too large to be used directly by TLB hit logic. Accordingly, in at least one embodiment, the address translation logic of the processing system described below translates the WorldID and ASID associated with the current virtual address space context of the processing system to corresponding WorldID and ASID search keys, which have fewer bits than the original identifiers and thus require less complex TLB hit logic. The resulting WorldID search key and ASID search key are buffered and used to perform one or more TLB lookups to obtain address mapping information related to the particular address space represented by the WorldID/ASID combination. The address mapping information then is used to translate a virtual address associated with the memory access request to the corresponding physical address.

Figure 1:
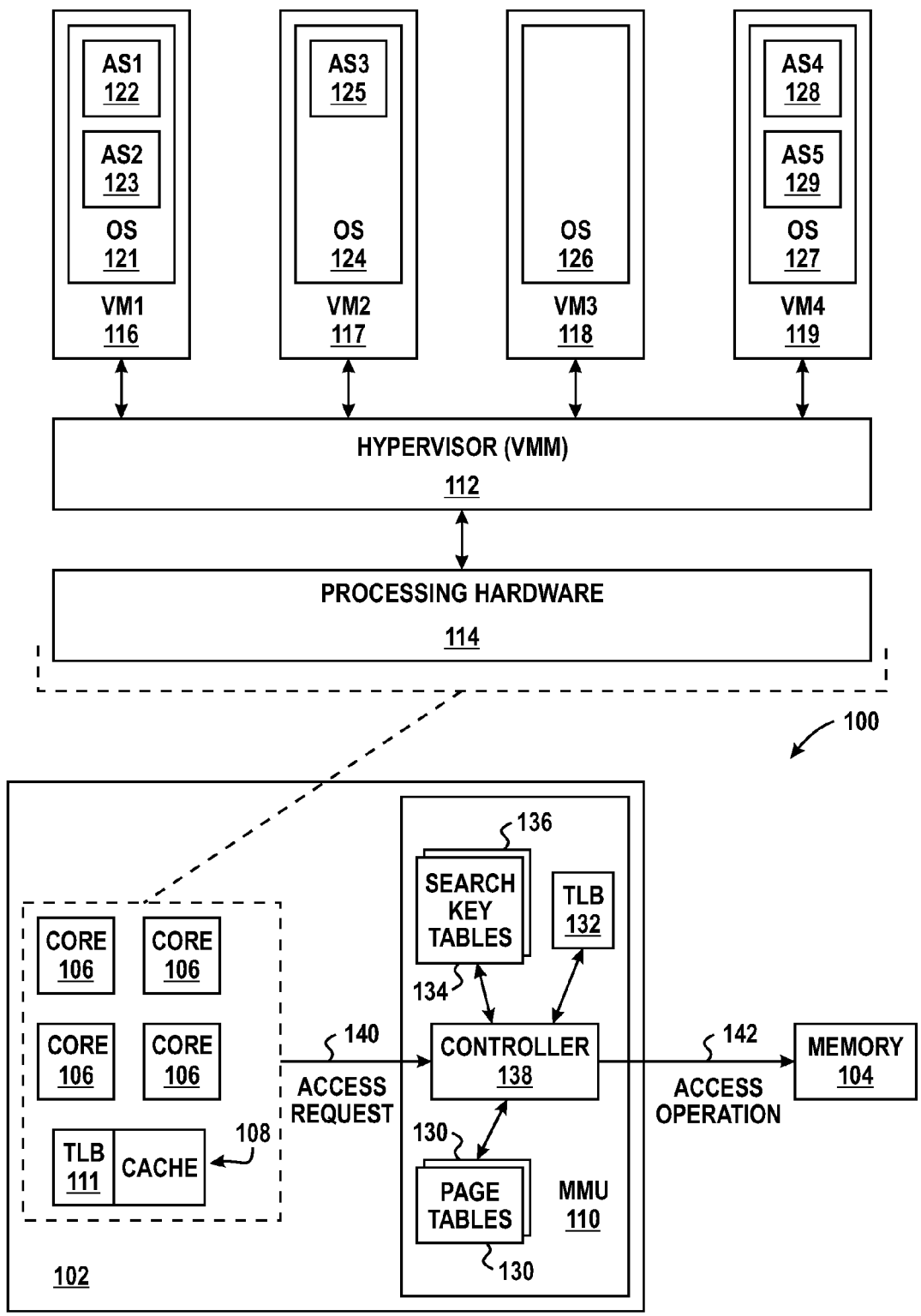
FIG. 1 is a diagram illustrating a virtualized processing system having hardware-based memory mapping in accordance with at least one embodiment of the present disclosure.

FIG. 1 illustrates a virtualized processing system 100 implementing hardware-based virtual-to-physical address mapping in accordance with at least one embodiment of the present disclosure. In the depicted example, the processing system 100 includes one or more processors 102 and a memory subsystem 104. The processor 102 includes one or more processor cores 106, a cache subsystem 108, and a memory management unit (MMU) 110. The memory subsystem 104 is connected to the processor cores 106 and the cache subsystem 108 via one or more busses, crossbar switches, or a combination thereof. The memory subsystem 104 can include system memory, external cache, input/output (I/O) devices, and other components that are assigned one or more physical addresses within the total address space of the processing system 100. In one embodiment, some or all of the components of the processor 102 can be designed based on a set of register-transfer-level (RTL) or Verilog instructions that define the functionality of the processor 102 which are synthesized to generate the electrical and electronic design of the processing device.

The processing system 100 is configured to support virtualization so as to implement one or more software-based virtual machines through the execution of virtualization software or virtualization firmware implementing a hypervisor 112 (also known as a virtual machine manager or VMM) that controls the implementation of multiple guest operating systems (OSs). The hypervisor 112 provides each guest OS the appearance of full control over the processing hardware 114 of the processor system 100 by intercepting and emulating certain operations, such as the changing of page tables, so as ensure the secure separation of the operations of each guest OS and related applications. Accordingly, the execution of a guest OS and any corresponding applications controlled by the guest OS is referred to as a "virtual machine." FIG. 1 illustrates an example whereby the hypervisor 112 manages four virtual machines: virtual machines 116, 117, 118, and 119 (also referred to as VM1, VM2, VM3, and VM4, respectively). For ease of illustration, each virtual machine 116 is depicted as supporting a single OS. The virtual machine 116 executes a guest OS 121 with applications 122 and 123 (AS1 and AS2), the virtual machine 117 executes a guest OS 124 with application 125 (AS3), the virtual machine 118 executes a guest OS 126, and the virtual machine 119 executes a guest OS 127 with applications 128 and 129 (AS4 and AS5). In other implementations, each virtual machine can support multiple guest operation systems.

A common goal of virtualization is to allow a single processing device to run multiple operating systems while maintaining secure, resource-guaranteed isolation between operating systems and their associated software applications. To implement this isolation, different virtual address spaces are used for different guest operating systems/virtual machines so as to control the particular memory locations a guest OS is permitted to access. Each guest OS operates in its own "world" relative to the memory subsystem 104 and thus each guest OS is assigned a unique identifier, referred to herein as a "WorldID." Further, it often is advantageous to isolate applications within a given OS environment, and thus each guest OS may assign different virtual address spaces to particular functions supported by the guest OS, such as certain kernel operations of the guest OS or software applications supported by the guest OS. To illustrate, the applications 122 and 123 each may operate in separate address spaces assigned by the guest OS 121, or the guest OS 121 may implement the same address space for both applications 122 and 123. The processing system 100 associates a unique identifier, referred to herein as the "address space identifier" or "ASID", to each virtual address space managed by the guest OS. As such, the combination of a particular WorldID and a particular ASID identifies a corresponding page table, or set of page tables, that is used to translate the virtual addresses generated by the application or OS associated with the particular WorldID and ASID into the corresponding physical addresses.

For ease of illustration, an embodiment whereby the MMU 110 is configured provide this virtual-to-physical address translation and otherwise facilitate memory access requests initiated within the different virtual machines 116-119 is described. However, in other embodiments, the address translation techniques described herein may be implemented by other components of the processing system 100. For example, the disclosed address translation techniques may be implemented by TLB logic 111 of the cache subsystem 108 or by the TLB logic of an instruction cache (not shown).

In one embodiment, the MMU 110 includes one or more page tables 130, a translation lookaside buffer (TLB) 132, a set of search key tables 134 and 136, and a hardware controller 138. Each page table 130 stores information representing the mapping between virtual addresses of a particular virtual address space and the corresponding physical addresses. The TLB 132 caches virtual-to-physical address mappings recently used by the processing system 100. The search key tables 134 and 136 are used to generate search keys for the TLB hit logic of the TLB 132 from the WorldIDs and ASIDs used in the virtual machines 116-119 as described in detail below.

The hardware controller 138 operates to manage access to the memory subsystem 104. When a virtual machine attempts to access a memory-mapped location, the hypervisor 112 initiates a memory access request 140 for processing by the MMU 110 so as to enact the requested memory access operation 142. The memory access request 140 typically includes the virtual address of the memory location at issue and includes or is associated with the WorldID of the virtual machine that initiated the memory access. Further, the memory access request 140 also includes or is associated with an ASID associated with the application or function that initiated the memory access. In one embodiment, the control register CR3 found in x86-based architectures is used to store the current ASID for a given processor core and thus the ASID can include, for example, a portion or the entirety of the bits stored in the control register CR3. The WorldID, or the combination of the WorldID and ASID, identifies a particular virtual address space associated with the virtual address supplied with the memory access request 140. Accordingly, the hardware controller 138 uses the WorldID and ASID to identify the particular virtual-to-physical address translation to be used to translate the virtual address to the corresponding physical address. The hardware controller 138 performs the indicated address translation and then submits the resulting physical address to the memory subsystem 104 as part of the memory access operation 142 so as to direct the memory subsystem 104 to access the indicated memory location.

As noted, each of the page tables 130 corresponds to a particular virtual address space so as to provide the particular mapping between virtual addresses of the virtual address space and the corresponding physical addresses. Because there is a relatively high latency in accessing the page tables 130 directly, the hardware controller 138 utilizes the TLB 132 to cache recently-used virtual-to-physical mappings. In performing the virtual-to-physical address translation for the memory access request 140, the hardware controller 138 first checks the TLB 132 to determine whether the TLB 132 already contains the particular virtual-to-physical mapping needed for the memory access request 140. In one embodiment, the hardware controller 138 uses TLB tagging and TLB hit logic to identify whether the mapping information for the corresponding virtual address space is within an entry of the TLB 132. As noted, the WorldID and ASID submitted with the memory access request 140 identify the unique virtual address space associated with the virtual address that is to be translated to a corresponding physical address. However, these values often are tens of bits long and thus would require considerably complex TLB hit logic if used directly as search keys for the tag array of the TLB 132. Accordingly, in at least one embodiment, the hardware controller 138 uses the search key tables 134 and 136 to convert the WorldID and ASID submitted with the memory access request 140 to smaller search keys that then may be used by the TLB hit logic of the TLB 132. In one example implementation, through the use of the search key tables 134 and 136 the WorldID can be converted from a 16-bit value to a 2-bit WorldID search key and the ASID can be converted from a 36-bit value to a 3-bit ASID search key.

After initially converting a WorldID and an ASID to a corresponding WorldID search key and an ASID search key, respectively, the hardware controller 138 buffers the resulting WorldID and ASID search keys and continues to use these buffered search keys for TLB lookups until there is an update to one or both of the WorldID or ASID due to a context change, such as when switching between execution of the hypervisor 112 and a guest OS or such as when a guest OS switches application-level address spaces by updating the ASID in the control register CR3 when switching between execution of one application to execution of another application. Thus, the mapping logic utilized by the hardware controller 138 to convert the WorldID and ASID to WorldID and ASID search keys need only run once per update to the WorldID or ASID.

Figure 2:
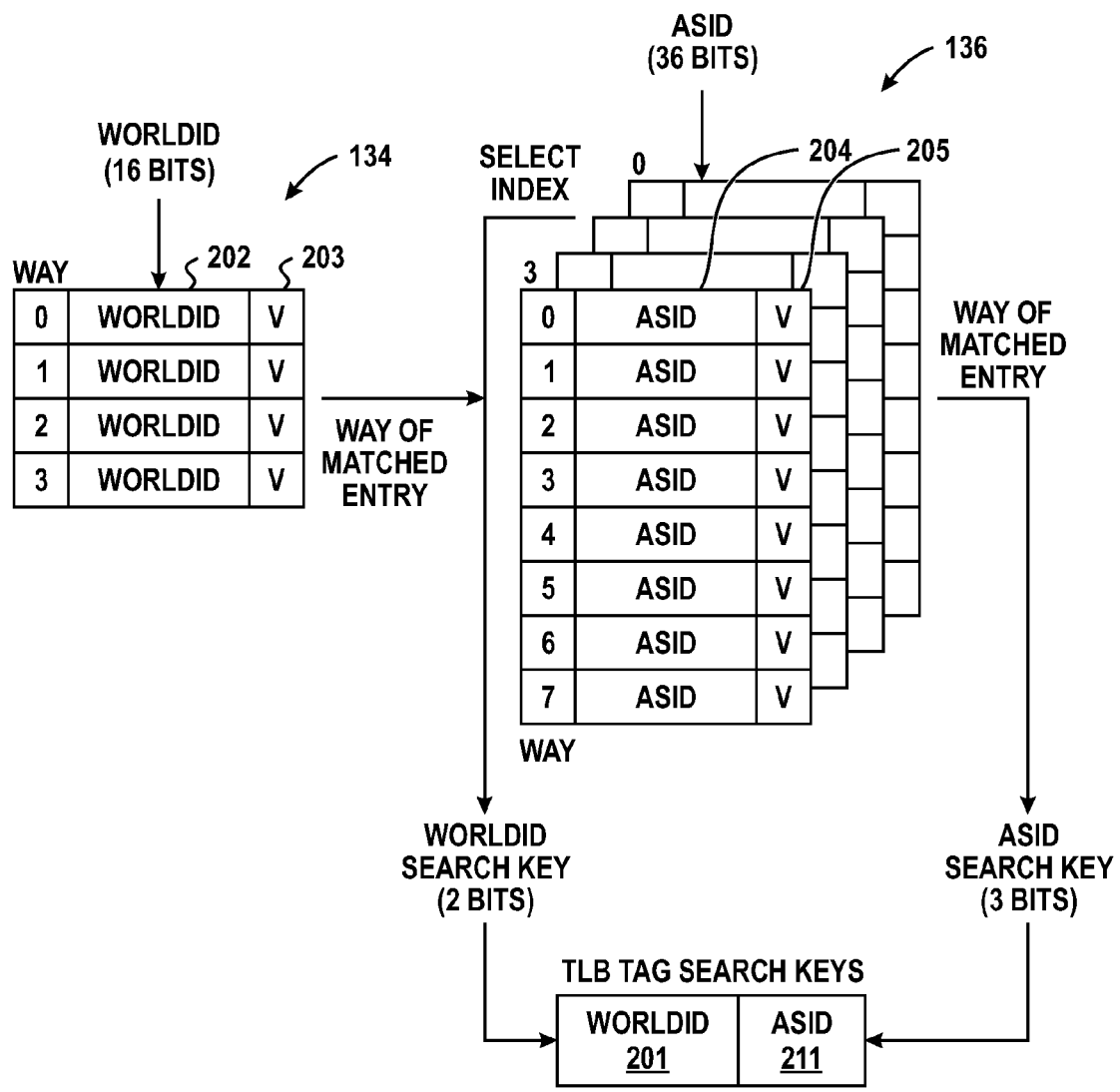
FIG. 2 is a diagram illustrating an example implementation of search key tables for generating relatively short search keys from relatively long address space identifiers in accordance with at least one embodiment of the present disclosure.

FIG. 2 illustrates an example implementation of the search key tables 134 and 136. The search key table 134 (referred to herein as the "WorldID table 134") comprises a fully associative cache or other data structure with $2^X$ entries, whereby X is the number of bits in the resulting WorldID search key 201. In the depicted example, the WorldID table 134 has 4 ($2^2$) entries and thereby results in the generation of a 2-bit WorldID search key 201. Each entry of the WorldID table 134 is associated with a corresponding way (e.g., 0-3 in the example of FIG. 2) and each entry comprises a WorldID field 202 configured to store a corresponding WorldID. Each entry further can include various status fields, such as a valid field 203 to store a valid bit indicating whether the corresponding entry is a valid entry, as well as fields to store least recently used (LRU) or most recently used (MRU) information, and the like.

The search key table 136 (referred to herein as "the ASID table 136") comprises a set-associative cache or other data structure with X indices, each index associated with a corresponding way of the WorldID table 134 and each index comprising a set of $2^Y$ entries, whereby Y is the number of bits in the resulting ASID search key 211. In the depicted example, the ASID table 136 has 8 ($2^3$) entries and thus results in the generation of a 3-bit ASID search key 211. Each entry of the ASID table 136 is associated with a corresponding way (e.g., 0-7 in the example of FIG. 2) and each entry comprises an ASID field 204 configured to store a corresponding ASID. Each entry further can include various status fields, such as a valid field 205 to store a valid bit indicating whether the corresponding entry is a valid entry, as well as fields to store LRU or MRU information, and the like.

In one embodiment, the determination of the WorldID search key 201 and the ASID search key 211 includes a two-step process. To determine the WorldID search key 201 corresponding to a WorldID, the hardware controller 138 searches the WorldID table 134 to determine whether there is a matching entry that stores the WorldID. If such entry is found in the WorldID table 134, the WorldID search key 201 is set to the way of the found entry. To illustrate, if the third entry (way=2) of the WorldID table 134 stores the matching WorldID, the WorldID search key 201 would be set to the way of the third entry; that is 10b (2). After identifying the WorldID search key 201, the hardware controller 138 determines the ASID search key 211 corresponding to the ASID by using the way of the matching entry in the WorldID table 134 to identify the corresponding index of the ASID table 136 that is to be searched. Using the previous example, the way of the matching entry of the WorldID table 134 is index=2 and thus the hardware controller 138 would search index 2 (of indices 0-3) of the ASID table 136 to determine whether any of entries 0-7 in index 2 stores the ASID associated with the memory access request. If such entry is found in the indicated index of the ASID table 136, the ASID search key 211 is set to the way of the entry. To illustrate, if the fourth entry (way=3) of the ASID table 136 stores the matching ASID, the ASID search key 211 would be set to 011b (3).

Figure 3:
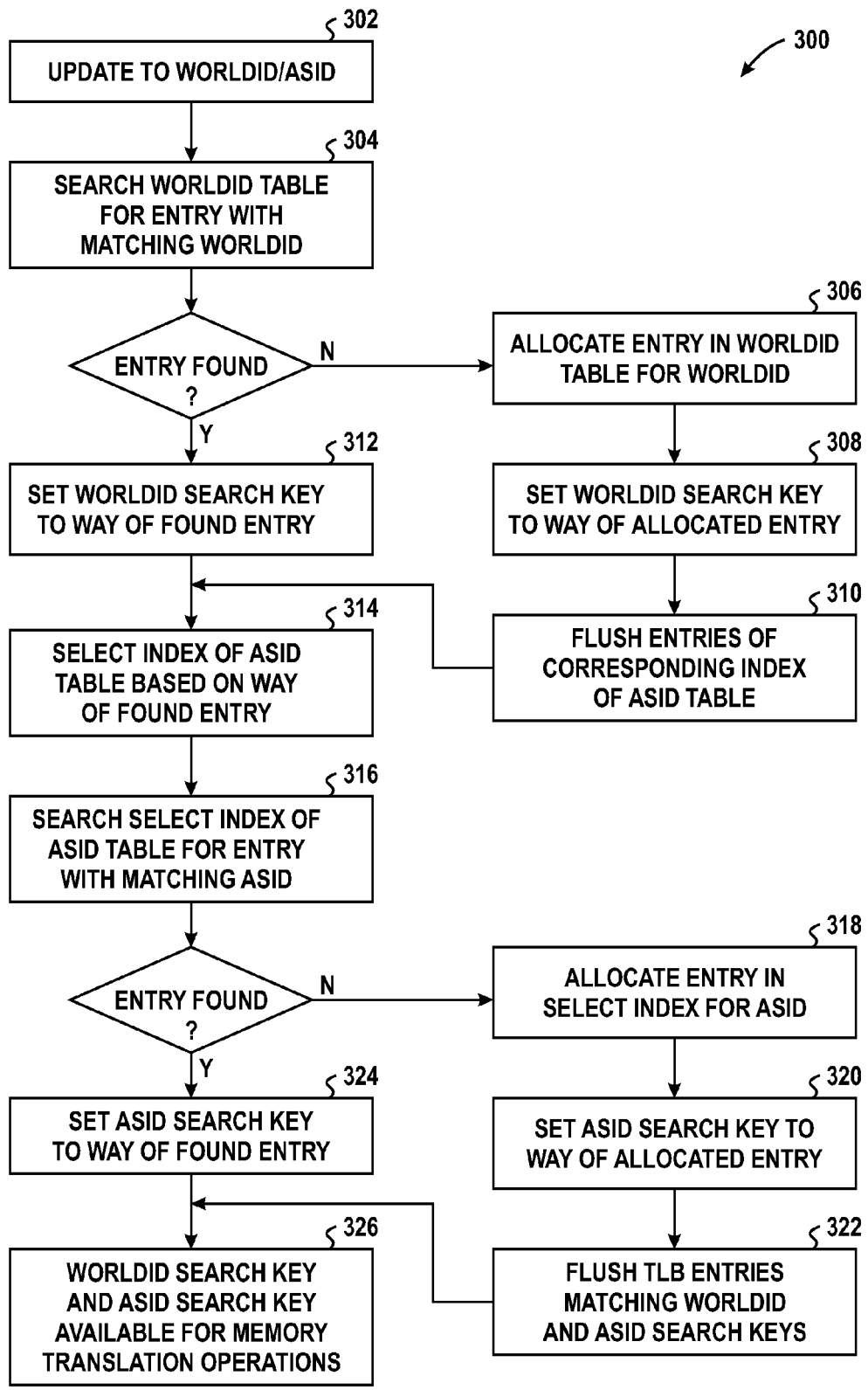
FIG. 3 is a flow diagram illustrating an example method for address translation in a virtualized processing system in accordance with at least one embodiment of the present disclosure.

FIG. 3 illustrates an example method 300 of operation of the hardware controller 138 for determining the WorldID and ASID search keys using the WorldID table 134 and ASID table 136 of FIG. 2 in accordance with at least one embodiment of the present disclosure. The method 300 initiates in response to an update to the address space context at block 302. This update can include a change in the current ASID, the current WorldID, or both. To illustrate, when a context switch occurs between the hypervisor 112 and a guest OS, or between guest OSs, the WorldID and ASID are updated to reflect the new address space. Similarly, when the currently-executed guest OS switches address spaces (e.g., such as when switching between applications), the ASID is updated. In x86-based processor architectures, the control register CR3 often serves as the page directory base register (PDBR) that points to the particular page tables associated with the current virtual address space and thus some portion or the entirety of the bits stored in the control register CR3 can be used as the ASID. Accordingly, an update to the current ASID in use can be detected as an update to the value stored in the control register CR3.

At block 304, the hardware controller 138 employs hit logic to search the WorldID table 134 for an entry storing the WorldID. In the event that no entry storing the same WorldID is found, at block 306 the hardware controller 138 allocates an entry in the WorldID table 134 for the WorldID associated with the memory access request. The allocation of an entry can include allocating an unused entry or evicting a presently-used entry. The entry to be evicted can be selected as, for example, the least recently used entry. The allocated entry in the WorldID table 134 then is populated with the WorldID received at block 302 and the appropriate status flags are set. At block 308 the WorldID search key is set to the way of the entry in the WorldID table 134 allocated at block 306. At block 310, the entries of the index of the ASID table 136 that correspond to the allocated entry of the WorldID table 134 are flushed and an entry of the index is selected and populated with the ASID received at block 302.

Returning to block 304, in the event that a matching entry of the WorldID table 134 is found, at block 312 the hardware controller 138 sets the WorldID key 201 to the way of the matching entry. At block 314 the hardware controller 138 selects the index of the ASID table 136 associated with the matching entry of the WorldID table 134 and at block 316 the hardware controller 138 searches the set of entries of the selected index of the ASID table 136 for a matching entry that stores the ASID received at block 302.

In the event that no matching entry of the selected way is found, at block 318 the hardware controller 138 allocates an entry of the selected index of the ASID table 136 to store the ASID, either by selecting an unused entry or by evicting an in-use entry. At block 320 the hardware controller 138 sets the ASID search key to the way of the entry allocated at block 318. At block 322, the hardware controller 138 flushes any entries of the TLB 132 that match the WorldID and ASID search keys determined via the process of blocks 302-322. Returning to block 316, in the event that a matching entry of the selected way is found, at block 324 the hardware controller 138 sets the ASID search key 211 to the way of the matching entry.

After setting the current WorldID and ASID search keys, at block 326 the hardware controller 138 can utilize the WorldID and ASID search keys to populate corresponding entries of the TLB 132 with page translation information through page walks and to perform TLB lookups for virtual-to-physical memory address translations until the next address space context change, at which point the next iteration of method 300 is initiated for the updated WorldID/ASID.

Figure 4:
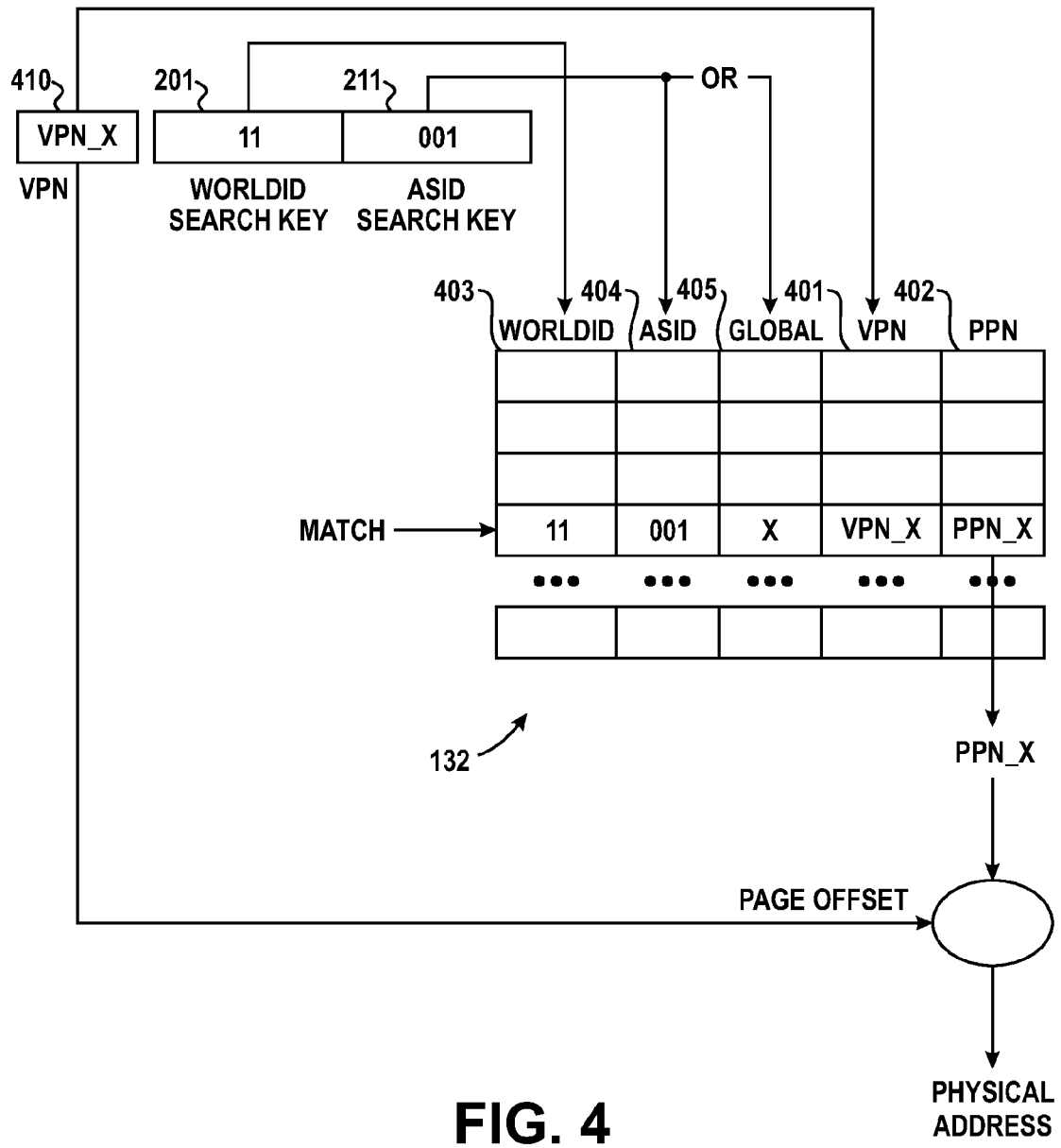
FIG. 4 is a diagram illustrating an example TLB lookup using search keys based on address space identifiers in accordance with at least one embodiment of the present disclosure.

FIG. 4 illustrates an example implementation of a TLB lookup using the WorldID search key 201 and the ASID search key 211 in accordance with at least one embodiment of the present disclosure. In the depicted example, the TLB 132 comprises a table or other data structure comprising a plurality of entries, each entry having a virtual page number (VPN) field 401 configured to store a corresponding virtual page number and a physical page number (PPN) field 402. Each entry further is associated with a WorldID tag field 403 configured to store a corresponding WorldID search key, an ASID tag field 404 configured to store a corresponding ASID search key, and a global address field 405 configured to store a global bit that, when set, indicates that the associated mapping is global to the corresponding virtual machine (that is, global to all address spaces within a virtual machine). To perform the TLB lookup, the hardware controller 138 employs TLB hit logic to search the entries of the TLB 132 for an entry that matches the WorldID search key 201 and the VPN of the virtual memory address of the memory access request being processed and which either matches the ASID search key or has the global bit set. If an entry in the TLB 132 meets each of these search conditions (that is: matching WorldID search key AND matching VPN and (matching ASID search key OR global bit set)), the hardware controller 138 uses the physical page number (PPN_X) stored in the PPN field 402 of the entry to translate the virtual address of the memory access request to the corresponding physical address. This translation typically is achieved by concatenating the physical page number to a page offset determined from some portion or the entirety of the virtual address so as to generate the physical address.

Another aspect of the present disclosure includes a computer readable memory storing data representative of a set of instructions that when executed are adapted to facilitate the design of hardware to implement the virtual-to-physical address translation techniques described above. As such, devices implementing the techniques described above may be embodied in software disposed, for example, in a computer usable (e.g., readable) medium configured to store the software (e.g., a computer readable program code). The program code causes the enablement of embodiments of the present disclosure, including the fabrication of the systems and methods disclosed herein. For example, this can be accomplished through the use of general programming languages (such as C or C++), hardware description languages (HDL) including Verilog, Verilog-A, HDL, VHDL, Altera HDL (AHDL) and so on, or other available programming and/or schematic capture tools (such as circuit capture tools). The program code can be disposed in any known computer usable medium including semiconductor, magnetic disk, optical disk (such as CD-ROM, DVD-ROM). It is understood that the functions accomplished and/or structure provided by the systems and techniques described above can be represented in a core (such as a GPU core) that is embodied in program code and may be transformed to hardware as part of the production of integrated circuits.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. In a system comprising one or more processors implementing a plurality of virtual machines, a method comprising:
   performing a translation lookaside buffer (TLB) lookup using a first search key and a second search key, the first search key representing a first identifier of an operating system executed in association with a corresponding virtual machine of the plurality of virtual machines, the first search key having fewer bits than the first identifier, and the second search key representing a second identifier of a virtual address space managed by the operating system, the second search key having fewer bits than the second identifier.

2. The method of claim 1, further comprising:
   accessing a first table based on the first identifier, the first table comprising a plurality of entries, each entry associated with a corresponding way and configured to store an identifier of an operating system executed by a virtual machine; and
   determining the first search key based on a first way of a select entry of the first table that stores the first identifier.

3. The method of claim 2, further comprising:
   determining a select index of a plurality of indices of a second table based on the first way and accessing the select index based on the second identifier, each entry of the second table having a corresponding way and configured to store an identifier of a virtual address space managed by a corresponding operating system; and
   determining the second search key based on a second way of a select entry of the select index that stores the second identifier.

4. The method of claim 3, wherein the first search key is determined by the first way and the second search key is determined by the second way.

5. The method of claim 3, further comprising:
   storing the first identifier to the select entry of the first table; and
   flushing the entries of the select index of the second table and storing the second identifier to the select entry of the select index.

6. The method of claim 1, wherein performing the TLB lookup comprises:
   accessing a TLB to identify a select entry of the TLB that has the first search key and that has at least one of the second identifier or a set global bit; and
   generating a physical address based on a page number stored at the select entry of the TLB.

7. A non-transitory machine-readable storage medium to store a set of instructions, wherein the set of instructions comprises hardware description language (HDL) instructions configured to determine a design of the system to implement the method of claim 1.

8. In a system comprising one or more processors implementing a plurality of virtual machines, a method comprising:
   determining a first identifier of an operating system executed in association with a select virtual machine of the plurality of virtual machines and determining a second identifier of a virtual address space managed by the operating system;
   accessing a first table based on the first identifier, the first table comprising a plurality of entries, each entry having a corresponding way and configured to store an identifier of an operating system associated with a corresponding virtual machine of the system;
   determining a first search key based on a first way of a select entry of the first table that stores the first identifier;
   determining a select index of a plurality of indices of a second table based on the first way and accessing the select index based on the second identifier, each entry of the second table having a corresponding way and configured to store an identifier of a virtual address space managed by an operating system of a corresponding virtual machine; and
   determining a second search key based on a second way of a select entry of the select index that stores the second identifier.

9. The method of claim 8, further comprising:
   performing a translation lookaside buffer (TLB) lookup using the first search key and the second search key to determine a page offset; and
   generating a physical address based on the page offset and the virtual address.

10. The method of claim 9, wherein performing a TLB lookup comprises:
    accessing the TLB to identify a select entry of the TLB that has the first search key and that has at least one of the second identifier or a set global bit.

11. The method of claim 8, wherein the first search key has fewer bits than the first identifier and the second search key has fewer bits than the second identifier.

12. A non-transitory machine-readable storage medium to store a set of instructions, wherein the set of instructions comprises hardware description language (HDL) instructions configured to determine a design of the system to implement the method of claim 8.

13. A processing system comprising:
- a translation lookaside buffer (TLB); and
- a hardware controller to perform a TLB lookup using a first search key and a second search key, the first search key representing a first identifier of an operating system executed in association with a virtual machine of a plurality of virtual machines implemented with the processing system, the first search key having fewer bits than the first identifier, and the second search key representing a second identifier of a virtual address space managed by the operating system, the second search key having fewer bits than the second identifier.

14. The processing system of claim 13, further comprising:
- a first table comprising a plurality of entries, each entry having a corresponding way and configured to store an identifier of an operation system executed by a corresponding virtual machine; and
- wherein the hardware controller is to determine the first search key based on a first way of a select entry of the first table that stores the first identifier.

15. The processing system of claim 14, further comprising:
- a second table comprising a plurality of indices, each index associated with a corresponding entry of the first table and each index comprising a plurality of entries, each entry of the second table having a corresponding way and configured to store an identifier of a virtual address space managed by an operating system of a corresponding virtual machine; and
- wherein the hardware controller is to determine a select index of the plurality of indices based on the first way and to determine the second search key based on a second way of a select entry of the select index that stores the second identifier.

16. The processing system of claim 15, wherein the first search key is the first way and the second search key is the second way.

17. The processing system of claim 15, wherein the hardware controller further is to:
- store the first identifier to the select entry of the first table;
- flush the entries of the select index; and
- store the second identifier to the select entry of the select index.

18. The processing system of claim 13, wherein the hardware controller is to perform the TLB lookup by accessing the TLB to identify a select entry of the TLB that has the first search key and that has at least one of the second identifier or a set global bit, and the hardware controller further is to generate a physical address based on a page number stored at the select entry of the TLB.

\* \* \* \* \*